US010502424B2

(12) United States Patent
Monty et al.

(10) Patent No.: US 10,502,424 B2
(45) Date of Patent: Dec. 10, 2019

(54) VOLUTE COMBUSTOR FOR GAS TURBINE ENGINE

(71) Applicant: General Electric Company, Schenectady, NY (US)

(72) Inventors: Joseph Douglas Monty, Boxford, MA (US); John Carl Jacobson, Melrose, MA (US)

(73) Assignee: General Electric Company, Schenectady, NY (US)

( * ) Notice: Subject to any disclaimer, the term of this patent is extended or adjusted under 35 U.S.C. 154(b) by 177 days.

(21) Appl. No.: 15/673,620

(22) Filed: Aug. 10, 2017

(65) Prior Publication Data

US 2019/0049114 A1    Feb. 14, 2019

(51) Int. Cl.
| | |
|---|---|
| *F23R 3/52* | (2006.01) |
| *F23R 3/58* | (2006.01) |
| *F23R 3/14* | (2006.01) |
| *F02C 7/10* | (2006.01) |
| *F01D 5/04* | (2006.01) |
| *F02C 7/08* | (2006.01) |

(52) U.S. Cl.
CPC ............. *F23R 3/14* (2013.01); *F01D 5/04* (2013.01); *F02C 7/10* (2013.01); *F02C 7/08* (2013.01)

(58) Field of Classification Search
CPC ...... F23R 3/02; F23R 3/44; F23R 3/52; F23R 3/58; F23R 3/42; F23R 3/425; F23R 3/56; F01D 9/045; F01D 9/048; F01D 9/047; F05D 2250/15; F05D 2250/25; F02C 3/14; F02C 7/10; F02C 7/08
See application file for complete search history.

(56) References Cited

U.S. PATENT DOCUMENTS

| | | | | |
|---|---|---|---|---|
| 2,801,519 | A | * | 8/1957 | Wood ................. F01D 9/026 60/39.511 |
| 2,828,608 | A | | 4/1958 | Cowlin et al. |
| 3,012,402 | A | | 12/1961 | Probert et al. |
| 3,623,318 | A | | 11/1971 | Shank |
| 3,837,760 | A | * | 9/1974 | Stalker ................. F04D 21/00 415/181 |
| 3,894,579 | A | * | 7/1975 | Brille ................... F02C 7/08 165/6 |
| 3,896,875 | A | * | 7/1975 | Bolger ................. F02C 7/10 165/86 |

(Continued)

FOREIGN PATENT DOCUMENTS

GB    719379 A    12/1954

OTHER PUBLICATIONS

Extended European Search Report and Opinion issued in connection with corresponding EP Application No. 18188417.2 dated Oct. 29, 2018.

*Primary Examiner* — Gerald L Sung
*Assistant Examiner* — Todd N Jordan
(74) *Attorney, Agent, or Firm* — Dority & Manning, P.A.

(57) ABSTRACT

The present disclosure is directed to a combustor assembly for a gas turbine engine. The combustor assembly comprises a volute walled enclosure defining a spiral scroll pitch axis disposed at least partially circumferentially around a centerline axis of the gas turbine engine, in which the walled enclosure is defined around the pitch axis, and the walled enclosure defines a combustion chamber therewithin.

19 Claims, 3 Drawing Sheets

(56) References Cited

U.S. PATENT DOCUMENTS

| | | | | |
|---|---|---|---|---|
| 4,064,690 A * | 12/1977 | Kronogard | ............... | F02C 3/103 |
| | | | | 60/39.163 |
| 4,286,430 A | 9/1981 | Smith | | |
| 4,300,349 A * | 11/1981 | Heckel | ....................... | F02C 7/24 |
| | | | | 415/197 |
| 4,382,359 A * | 5/1983 | Sampayo | .................. | F02C 7/08 |
| | | | | 60/39.511 |
| 4,813,228 A * | 3/1989 | Hueller | ..................... | F02C 3/10 |
| | | | | 60/39.511 |
| 5,079,911 A * | 1/1992 | Kumakura | ................ | F02C 7/08 |
| | | | | 60/39.511 |
| 5,253,472 A * | 10/1993 | Dev | ........................ | F01D 5/085 |
| | | | | 60/39.43 |
| 5,317,865 A * | 6/1994 | Inoue | ..................... | F23R 3/425 |
| | | | | 60/722 |
| 5,855,112 A * | 1/1999 | Bannai | ..................... | F02C 3/05 |
| | | | | 60/39.511 |
| 6,308,513 B1 * | 10/2001 | Hatanaka | ................ | F01D 15/10 |
| | | | | 60/805 |
| 7,007,475 B2 * | 3/2006 | Nguyen | ................. | F23R 3/425 |
| | | | | 415/205 |
| 7,040,096 B2 | 5/2006 | Manteiga et al. | | |
| 7,984,615 B2 * | 7/2011 | Woodcock | .............. | F01D 9/026 |
| | | | | 60/754 |
| 9,217,368 B2 | 12/2015 | Myoren et al. | | |
| 9,394,828 B2 | 7/2016 | Eleftheriou et al. | | |
| 9,395,122 B2 | 7/2016 | Eleftheriou et al. | | |
| 2006/0123796 A1 * | 6/2006 | Aycock | .................. | F01D 9/065 |
| | | | | 60/782 |
| 2009/0003998 A1 | 1/2009 | Woodcock et al. | | |
| 2016/0298542 A1 | 10/2016 | Eleftheriou et al. | | |
| 2018/0195729 A1 * | 7/2018 | Smoke | .................... | F23R 3/425 |

* cited by examiner

VOLUTE COMBUSTOR FOR GAS TURBINE ENGINE

FIELD

The present subject matter relates generally to gas turbine engine combustion assemblies.

BACKGROUND

Gas turbine engines are generally space-restricted based on the apparatus in which they operate (e.g., fixed wing or rotary wing aircraft propulsion, auxiliary power units, land or marine vehicle propulsion, missile propulsion, etc.). Certain gas turbine engines may be more space-restricted than others, such as to limit or eliminate radial or axial protrusions or non-axisymmetric features.

For example, for small gas turbine engines (e.g., those producing approximately 500 shaft horsepower or less), practical considerations of component size and cost become limiting on components such as fuel injectors. Dimensions such as fuel passage size and metering orifice areas on the liner may become too small to allow practical manufacturing tolerances and, as such, become prone to plugging, clogging, or other obstructions that may deteriorate performance, efficiency, operability, or increase maintenance and operating cost, or result in overall combustor and engine failure. Additionally, as unit cost of a fuel injector does not become substantially less as the injector gets smaller, multiple fuel injector designs undesirably become a major limiting factor in achieving cost targets for small gas turbine engines.

A known solution for small gas turbine engines is a single can combustor with a single fuel injector large enough to have practical manufacturing dimensions and tolerances. However, known can combustors provide radial and/or axial protrusions of the combustor from an otherwise axisymmetric device, thus undesirably increasing radial and/or axial dimensions of the engine. Furthermore, known combustors may include radially and/or axially protruding ducting that is required to direct air from an annular compressor exit to the cylindrical can combustor.

As such, there is a need for a gas turbine engine that provides improved gas turbine engine radial and/or axial packaging.

BRIEF DESCRIPTION

Aspects and advantages of the invention will be set forth in part in the following description, or may be obvious from the description, or may be learned through practice of the invention.

The present disclosure is directed to a combustor assembly for a gas turbine engine. The combustor assembly includes a volute walled enclosure defining a spiral scroll pitch axis disposed at least partially circumferentially around a centerline axis of the gas turbine engine. The walled enclosure is defined around the pitch axis and defines a combustion chamber therewithin.

In one embodiment, the walled enclosure defines the combustion chamber as a scroll contour, in which a cross sectional area of the combustion chamber defined by the walled enclosure decreases along a downstream direction to provide an approximately constant axial velocity downstream flow of combustion gases through the combustion chamber along the pitch axis.

In various embodiments, the pitch axis is further extended along the axial direction, in which the pitch axis defines a helix around the centerline axis of the gas turbine engine. In one embodiment, the combustor defines a radius of the pitch axis relative to the centerline axis generally decreasing along a length along the axial direction relative to an upstream end of the combustion chamber, and the walled enclosure defines a cross sectional area of the combustion chamber decreasing along the axial direction.

In still various embodiments, the walled enclosure defines an end wall disposed at an upstream end of the walled enclosure. In one embodiment, the combustor assembly further includes a fuel injector assembly disposed at least partially through the end wall of the walled enclosure. The fuel injector assembly is disposed approximately along the pitch axis.

In still yet various embodiments, the combustor assembly further includes an outer casing surrounding the volute walled enclosure. The outer casing defines an inlet opening in fluid communication with an upstream end of the walled enclosure. In one embodiment, the outer casing is defined at least partially co-directional to the walled enclosure around the centerline axis of the gas turbine engine.

Another aspect of the present disclosure is directed to a gas turbine engine defining a centerline axis. The gas turbine engine includes a combustor assembly comprising a volute walled enclosure defining a spiral scroll pitch axis disposed at least partially circumferentially around a centerline axis of the gas turbine engine. The walled enclosure is defined around the pitch axis and defines a combustion chamber therewithin.

In one embodiment, the volute walled enclosure of the combustor assembly defines the combustion chamber as a scroll contour, wherein a cross sectional area of the walled enclosure defining the combustion chamber decreases along a downstream direction to provide an approximately constant velocity downstream flow of combustion gases through the combustion chamber along the pitch axis.

In various embodiments of the gas turbine engine, the pitch axis is further extended along the axial direction, in which the pitch axis defines a helix around the centerline axis of the gas turbine engine. In one embodiment, the combustor defines a radius of the pitch axis relative to the centerline axis generally decreasing along a length along the axial direction relative to an upstream end of the combustion chamber, and the walled enclosure defines a cross sectional area of the combustion chamber decreasing along the axial direction.

In another embodiment of the gas turbine engine, the combustor assembly further includes an outer casing surrounding the volute walled enclosure. The outer casing defines an inlet opening in fluid communication with an upstream end of the walled enclosure, and the outer casing defines a pressure plenum surrounding the volute walled enclosure. In one embodiment, the volute walled enclosure of the combustor assembly defines one or more dilution openings therethrough in fluid communication with the pressure plenum.

In still various embodiments, the gas turbine engine further includes a turbine section disposed downstream of the combustor assembly in fluid communication with the combustion chamber upstream of the turbine section. The turbine section includes a first vane assembly coupled to the volute walled enclosure and disposed at a downstream end of the combustion chamber. In one embodiment, the first vane assembly comprises a plurality of airfoils in adjacent circumferential arrangement around the centerline axis. In another embodiment, the plurality of airfoils are in asymmetric circumferential arrangement, in which asymmetric circumferential arrangement of the plurality of airfoils provides an approximately constant axial velocity downstream flow of combustion gases.

In another embodiment, the gas turbine engine further includes a compressor section upstream of the combustor assembly in fluid communication with the pressure plenum downstream of the compressor section. In one embodiment, the compressor section defines a centrifugal compressor.

In various embodiments, the gas turbine engine includes a single combustor assembly defining a single volute walled enclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
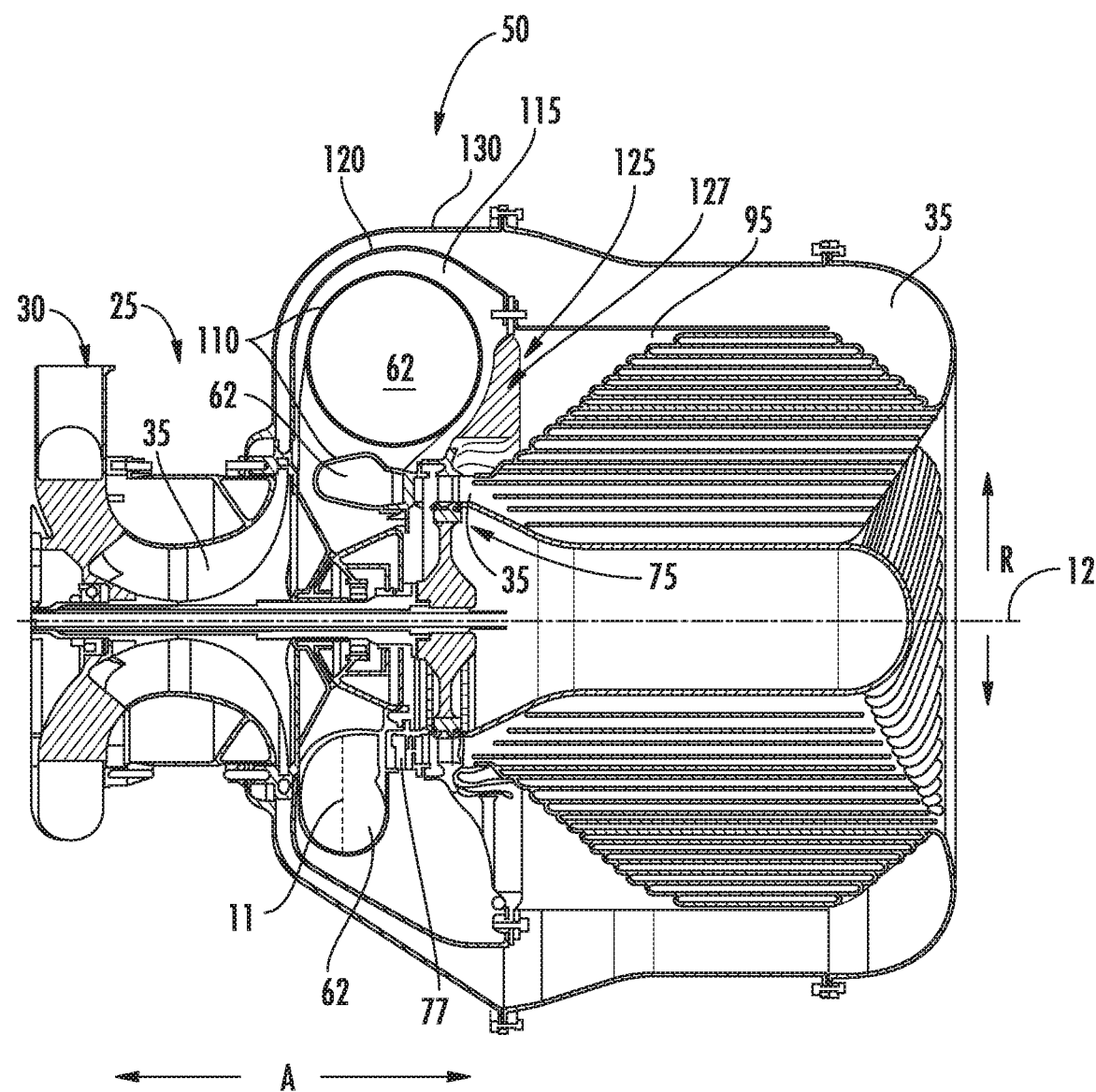
FIG. 1 is an axial cross sectional view of an exemplary gas turbine engine incorporating an exemplary embodiment of a combustor assembly according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a gas turbine engine and combustor assembly are generally provided that provide an improved packaging and minimizes non-axisymmetric features or protrusions along the radial or axial direction. The engines and combustor assemblies generally provided herein enable use of a single can combustor in relatively small gas turbine engine applications. The embodiments generally provided herein may reduce part quantities and complexities in small gas turbine engines, such as, but not limited to, those for land or marine vehicles and auxiliary power units.

Referring now to FIG. 1, an exemplary embodiment of a gas turbine engine 10 (hereinafter "engine 10") is generally provided. The engine 10 defines an axial direction A and a reference centerline axis 12 extended along the axial direction A. A reference radial direction R and circumferential direction C are each extended from the centerline axis 12. Although the engine 10 generally provided may depict a turboshaft or turboprop engine configuration, it should be appreciated that the embodiments of the engine 10 and combustor assembly 50 generally provided herein may be configured as turbofan and turbojet gas turbine engines, as well as auxiliary power units, land- or marine-based power generation units, or gas turbine engines for land, marine, or air apparatuses, including land and marine vehicles, missile propulsion, and rotary-wing or fixed-wing aircraft.

The engine 10 includes a compressor section 25, a combustor assembly 50, and a turbine section 75 in serial flow arrangement. In the embodiment generally provided, the compressor section 25 defines an inlet opening 30 to a primary flowpath 35 defined through the engine 10. In various embodiments, the compressor section 25 defines, at least in part, a radial or centrifugal compressor. In the embodiment provided in FIG. 1, the engine 10 defines a single can volute combustor assembly 50. In other embodiments, should be understood that a plurality of volute combustor assemblies 50 may be disposed in serial or parallel arrangement between the compressor section 25 and the turbine section 75.

The engine 10 further includes an outer wall 130 defining in part the primary flowpath 35 downstream of the compressor section 25. The outer wall 130 may generally surround or enclose the combustor assembly 50. In various embodiments, the outer wall 130 further surrounds or encloses the turbine section 75. In one embodiment, the engine 10 further includes a recuperator or heat exchanger 95 disposed along the primary flowpath 35 between the compressor section 25 and the combustor assembly 50.

Figure 2:
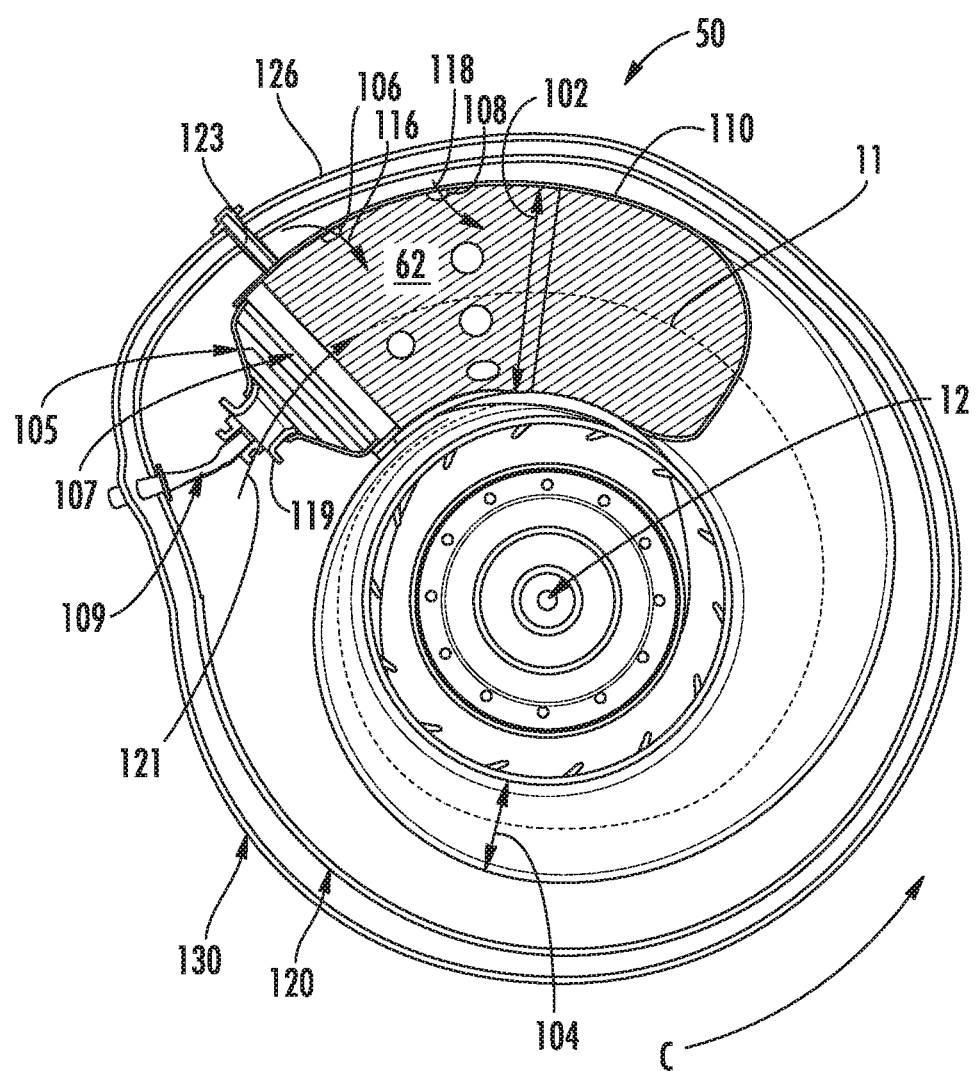
FIG. 2 is a cross sectional view of an exemplary embodiment of a combustor assembly according to an aspect of the present disclosure.

Referring to FIG. 2, a cross sectional view of an exemplary embodiment of the combustor assembly 50 is generally provided. Referring now to FIGS. 1-2, the combustor assembly 50 defines a spiral scroll pitch axis 11 disposed at least partially circumferentially around the centerline axis 12 of the engine 10. A volute walled enclosure 110 is defined around the pitch axis 11. Within the walled enclosure 110 is defined a combustion chamber 62.

In various embodiments, the volute walled enclosure 110 of the combustor assembly 50 defines the combustion chamber 62 as a scroll contour. A cross sectional area of the walled enclosure 110, such as generally shown at 102 toward an upstream end of the combustion chamber 62, decreases along a downstream direction, such as generally shown at 104 toward a downstream end of the combustion chamber 62. The decreasing cross sectional area of the walled enclosure 110 defining the combustion chamber 62 generally provides an approximately constant velocity downstream flow of combustion gases through the combustion chamber 62 and primary flowpath 35 along the pitch axis 11.

In one embodiment, such as generally provided in FIG. 1, the pitch axis 11 is further extended at least partially along the axial direction A. As such, the pitch axis 11, and the walled enclosure 110 defined around the pitch axis 11, defines a helix around the centerline axis 12 of the engine 10.

For example, the combustor assembly 50 may define a radius of the pitch axis 11 relative to the centerline axis 12 decreasing along a length along the axial direction A relative to an upstream end of the combustion chamber 62. The walled enclosure 110 may define the cross sectional area of the combustion chamber 62 decreasing along the axial direction A (e.g., such as shown by example at the reference cross sectional areas at 102 and at 104).

In various embodiments, the pitch axis 11 and the walled enclosure 110 defined around the pitch axis 11 may extend further along the axial direction A such as to provide further clearance between the walled enclosure 110 and an inlet plane of the turbine section 75 (i.e., a plane defined from a radial direction R extended from the centerline axis 12 disposed where the combustor assembly 50 is mated to the turbine section 75). Further extension of the pitch axis 11 and the walled enclosure 110 along the axial direction A may enable mating the combustor assembly 50, or more specifically the walled enclosure 110, to the heat exchanger 95 without an additional volute walled enclosure 110 necessary to provide oxidizer to a cold side of the combustor assembly 50.

Referring still to FIGS. 1-2, the combustor assembly 50 further includes an outer casing 120 surrounding the volute walled enclosure 110. The outer casing 120 defines an annular inlet opening 125 (shown in FIG. 1) in fluid communication with an upstream end along the primary flowpath 35 of the walled enclosure 110. The outer casing 120 defines a pressure plenum 115 surrounding the volute walled enclosure 110. In various embodiments, the outer casing 120 is defined at least partially co-directional to the walled enclosure 110 around the centerline axis 12. For example, the outer casing 120 surrounds the volute walled enclosure 110 along the circumferential direction C and axial direction A except for the inlet opening 125. The compressor section 25 provides a flow of compressed oxidizer through the primary flowpath 35 to the pressure plenum 115 (and in various embodiments, through the heat exchanger 95 therebetween) and then to the combustion chamber 62 defined within the volute walled enclosure 110.

Referring to FIG. 1, in one embodiment, the inlet opening 125 is defined by one or more inlet members 127 disposed in adjacent circumferential arrangement around the centerline axis 12. The plurality of inlet member 127 may provide structural support to one or more of the combustor assembly 50, the turbine section 75, and the heat exchanger 95. In various embodiments, the plurality of inlet members 127 may further define a plurality of inlet airfoils conditioning an aerodynamic flow of the oxidizer through the inlet opening 125 into the combustor assembly 50. In one embodiment, the inlet members 127 are defined in symmetric arrangement around the centerline axis 12. In another embodiment, the inlet members 127, defining a plurality of inlet airfoils, are arranged in asymmetric arrangement around the centerline axis 12 to provide a circumferential turning or acceleration of a flow of oxidizer through the primary flowpath 35 from the compressor section 25 through the inlet opening 125 to the combustion chamber 62 within the walled enclosure 110.

Figure 3:
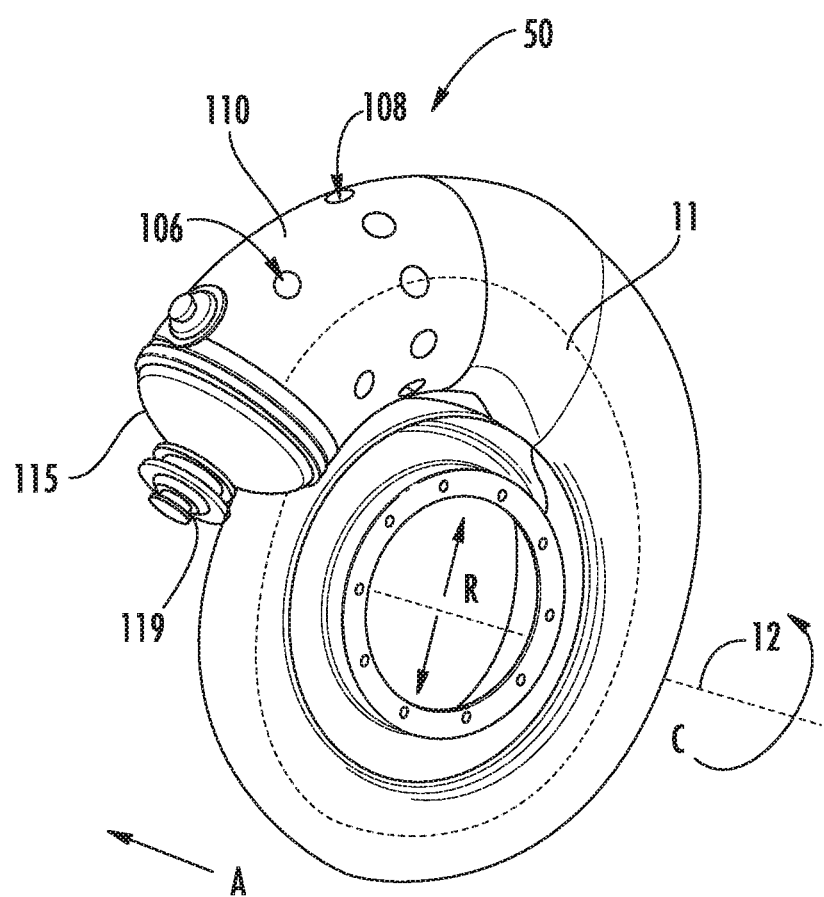
FIG. 3 is a perspective view of a combustor assembly according to an aspect of the present disclosure.

Referring back to FIG. 2, in addition to the perspective view of the exemplary embodiment of the combustor assembly 50 generally provided in FIG. 3, the walled enclosure 110 defines an end wall 105 disposed at an upstream end of the walled enclosure 110. The end wall 105 may generally define a dome or cap at the upstream end of the walled enclosure 110. In various embodiments, the end wall 105 defines an opening 107 through which a fuel injector assembly 109 is disposed at least partially through the end wall 105. In one embodiment, the fuel injector assembly 109 is disposed approximately along the pitch axis 11.

The fuel injector assembly 109 may generally include a nozzle through which a liquid or gaseous fuel (or combinations thereof) is introduced to the combustion chamber 62. The fuel injector assembly 109, or the end wall 105, may define a mixer or swirler 119 through which a flow of oxidizer, shown schematically by arrow 121, enters the combustion chamber 62 through the end wall 105 and mixes with the flow of fuel through the nozzle of the fuel injector assembly 109. Additionally, an igniter 123 is disposed through the outer wall 130, the outer casing 120, and at least partially through the walled enclosure 110. The igniter 123 provides energy to ignite the mixture of oxidizer and fuel within the combustion chamber 62 to produce combustion gases that then flow downstream through the volute walled enclosure 110 to the turbine section 75.

In still various embodiments, the volute walled enclosure 110 defines one or more dilution openings 106, 108 through the walled enclosure 110 in fluid communication with the pressure plenum 115. The dilution openings 106, 108 permit a flow of oxidizer, shown schematically by arrows 116 and 118, respectively, to egress from the pressure plenum 115 into the combustion chamber 62 defined within the walled enclosure 110.

In various embodiments, the combustion chamber 62 may more specifically define within the walled enclosure 110 one or more combustion zones. For example, the first dilution openings 106 may be defined upstream of the second dilution openings 108 further downstream along the walled enclosure 110. Between the end wall 105 and the first dilution openings 106 may be defined a primary combustion zone corresponding to the section of the combustion chamber 62 defined therebetween. Between the first dilution openings 106 and the second dilution openings 108 may be defined a secondary combustion zone corresponding to the section of the combustion chamber 62 defined therebetween. The combustion chamber 62 may further define a dilution mixing zone downstream of the dilution openings 108 to the turbine section 75.

In still various embodiments, the walled enclosure 110 may define one or more materials. For example, portions of the walled enclosure 110 corresponding to the end wall 105, the primary combustion zone, the secondary combustion zone, or parts or combinations thereof, may define a first material. Portions of the walled enclosure 110 corresponding downstream of the dilution openings 106, 108, such as the dilution mixing zone, may define a second material. The walled enclosure 110 may define a single, unitary component manufactured from any number of processes, including, but not limited to, those referred to as "additive manufacturing" or "3D printing". In still various embodiments, the walled enclosure 110 may be defined by a first material alone or combinations of a first material, a second material, etc. and joined by any number of casting, machining, welding, brazing, or sintering processes. For example, the first material may define one or more materials suitable for combustor assembly hot sections, such as, but not limited to, nickel, titanium, aluminum, steel, cobalt, or alloys of each, or combinations thereof, or a ceramic matrix composite or metal matrix composite material. The second material may define one or more similar or different materials, including, but not limited to, those that may characterize properties suitable for downstream flowpaths of combustion assemblies. Furthermore, the combustor assembly 50 may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components.

Referring back to FIG. 1, the turbine section 75 of the engine 10 is disposed downstream of the combustor assembly 50 in fluid communication with the combustion chamber 62 upstream of the turbine section 75. The turbine section 75 includes a first vane assembly 77 coupled to the volute walled enclosure 110 and disposed at a downstream end of the combustion chamber 62. The first vane assembly 77 includes a plurality of turbine airfoils in adjacent circumferential arrangement around the centerline axis 12. In one embodiment, the plurality of airfoils of the first vane assembly 77 is each in asymmetric circumferential arrangement around the centerline axis 12. The asymmetric circumferential arrangement of the plurality of airfoils of the first vane assembly 77 provides an approximately constant velocity along the axial direction A of the downstream flow of combustion gases from the combustion chamber 62.

Although not depicted herein, the embodiments of the combustor assembly 50 may define a main burner for the engine 10. In other embodiments, the combustor assembly 50 may define an inter-turbine burner defined between one or more turbines of the turbine section 75, or an afterburner define downstream of the turbine section 75.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine, the combustor assembly comprising:
    a volute walled enclosure defining a spiral scroll pitch axis disposed at least partially circumferentially around a centerline axis of the gas turbine engine, wherein the walled enclosure is defined around the pitch axis, the walled enclosure defining a combustion chamber therewithin;
    an outer casing surrounding the volute walled enclosure, and
    a plurality of inlet members positioned around the centerline axis, wherein the plurality of members defines an inlet opening at the outer casing in fluid communication with an upstream end of the volute walled enclosure,
    wherein a primary flowpath extends from a compressor section through a heat exchanger and into the inlet opening at the outer casing entering the combustion chamber and exiting through a turbine section, and further wherein the primary flow path extends from the turbine section through the heat exchanger.

2. The combustor assembly of claim 1, wherein the walled enclosure defines the combustion chamber as a scroll contour, wherein a cross sectional area of the combustion chamber defined by the walled enclosure decreases along a downstream direction to provide an approximately constant axial velocity downstream flow of combustion gases through the combustion chamber along the pitch axis.

3. The combustor assembly of claim 1, wherein the pitch axis is further extended along the axial direction, the pitch axis defining a helix around the centerline axis of the gas turbine engine.

4. The combustor assembly of claim 3, wherein the combustor defines a radius of the pitch axis relative to the centerline axis generally decreasing along a length along the axial direction relative to an upstream end of the combustion chamber, and wherein the walled enclosure defines a cross sectional area of the combustion chamber decreasing along the axial direction.

5. The combustor assembly of claim 1, wherein the walled enclosure defines an end wall disposed at an upstream end of the walled enclosure.

6. The combustor assembly of claim 5, further comprising:
    a fuel injector assembly disposed at least partially through the end wall of the walled enclosure, wherein the fuel injector assembly is disposed approximately along the pitch axis.

7. The combustor assembly of claim 1, wherein the outer casing is defined at least partially co-directional to the walled enclosure around the centerline axis of the gas turbine engine.

8. A gas turbine engine defining a centerline axis, the gas turbine engine comprising:
    a compressor section;
    a turbine section;
    a heat exchanger; and
    a combustor assembly comprising a volute walled enclosure defining a spiral scroll pitch axis disposed at least partially circumferentially around a centerline axis of the gas turbine engine, wherein the walled enclosure is defined around the pitch axis, the walled enclosure defining a combustion chamber therewithin;
    an outer casing surrounding the volute walled enclosure, and
    one or more inlet members positioned around the centerline axis, wherein the one or more inlet members is connected to the combustor assembly, and wherein the one or more inlet members defines an inlet opening at the outer casing in fluid communication with an upstream end of the volute walled enclosure, and wherein the outer casing defines a pressure plenum surrounding the volute walled enclosure,
    wherein a primary flowpath extends from the compressor section through the heat exchanger and into the inlet opening at the outer casing entering the combustion chamber and exiting through the turbine section, and further wherein the primary flow path extends from the turbine section through the heat exchanger.

9. The gas turbine engine of claim 8, wherein the volute walled enclosure of the combustor assembly defines the combustion chamber as a scroll contour, wherein a cross sectional area of the walled enclosure defining the combustion chamber decreases along a downstream direction to provide an approximately constant velocity downstream flow of combustion gases through the combustion chamber along the pitch axis.

10. The gas turbine engine of claim 8, wherein the pitch axis is further extended along the axial direction, the pitch axis defining a helix around the centerline axis of the gas turbine engine.

11. The gas turbine engine of claim 10, wherein the combustor defines a radius of the pitch axis relative to the centerline axis decreasing along a length along the axial direction relative to an upstream end of the combustion chamber, and wherein the walled enclosure defines a cross sectional area of the combustion chamber decreasing along the axial direction.

12. The gas turbine engine of claim 8, wherein the volute walled enclosure of the combustor assembly defines one or more dilution openings therethrough in fluid communication with the pressure plenum.

13. The gas turbine engine of claim 8,
wherein the turbine section comprises a first vane assembly coupled to the volute walled enclosure and disposed at a downstream end of the combustion chamber.

14. The gas turbine engine of claim 13, wherein the first vane assembly comprises a plurality of airfoils in adjacent circumferential arrangement around the centerline axis.

15. The gas turbine engine of claim 14, wherein the plurality of airfoils are in asymmetric circumferential arrangement, and wherein asymmetric circumferential arrangement of the plurality of airfoils provides an approximately constant axial velocity downstream flow of combustion gases.

16. The gas turbine engine of claim 8, wherein the compressor section defines a centrifugal compressor.

17. The gas turbine engine of claim 8, wherein the gas turbine engine comprises a single combustor assembly defining a single volute walled enclosure.

18. The gas turbine engine of claim 13, wherein the one or more inlet members is connected to the volute walled enclosure, the turbine section, and the heat exchanger.

19. The gas turbine engine of claim 8, wherein the inlet member comprises a plurality of inlet airfoils positioned around the centerline axis, wherein the plurality of airfoils defines the inlet opening at the outer casing in fluid communication with an upstream end of the volute walled enclosure.

* * * * *